Patented Feb. 19, 1935

1,991,808

UNITED STATES PATENT OFFICE 1,991,808

COMPLEX METAL COMPOUNDS OF AZO DYESTUFFS

Hans Krzikalla and Walter Limbacher, Ludwigshafen-on-the-Rhine, Germany, assignors to General Aniline Works, Inc., New York, N. Y., a corporation of Delaware No Drawing. Application June 30, 1933, Serial No. 678,542. In Germany July 16, 1932

5 Claims. (Cl. 260—12)

The present invention relates to new complex metal compounds of azo dyestuffs and a process of producing same.

We have found that valuable complex metal compounds of azo dyestuffs are obtained by treating azo dyestuffs containing at least one acid group, namely a sulphonic or carboxylic acid group and containing as the coupling component a 8-hydroxyquinoline, with agents supplying heavy metals for example copper, manganese, chromium, iron, nickel and cobalt. Suitable 8-hydroxy-quinolines are 8-hydroxyquinoline itself and its derivatives such as 8-hydroxyquinoline-5-sulphonic acid, 5-methyl-8-hydroxyquinoline, phenylimino-8-hydroxyquinolines, 5-chlor-8-hydroxy-quinoline and 8-hydroxyquinoline carboxylic acids. Any desired diazo compound may be used in the preparation of the azo dyestuffs to be converted into complex heavy metal compounds. The complex metal compounds obtained according to the present invention are especially suitable for dyeing leather and silk on which they yield beautiful, full, for example brown or green, shades distinguished by very good fastness to light. The said dyestuffs are also suitable for dyeing wool.

The treatment may be effected under ordinary pressure; preferably, however, it is carried out at elevated pressure. Usually the treatment is completed in some hours, for example in 3, 10 or 20 hours; according to the desired effect, the treatment may, however, be continued for a shorter or a longer period.

The following examples will further illustrate the nature of this invention but the invention is not restricted to these examples. The parts are by weight.

Example 1

32.9 parts of the azo dyestuff obtained by coupling diazotized metanilic acid with 8-hydroxyquinoline are dissolved in from 500 to 600 parts of water and heated in a closed vessel for 3 hours at 110° C. under the pressure developed with a solution of chromium formate containing 9.7 parts of $Cr_2O_3$. The resulting dyestuff is then salted out and dried. It dyes leather beautiful yellow-brown shades the said dyeing being fast to light. When used for dyeing wool the dyestuff yields orange shades of very good fastness to washing and fulling.

The complex iron compound of the same azo dyestuff may be prepared in an analogous manner by means of ferric acetate; it dyes leather beautiful chocolate-brown shades.

A dyestuff having a yellow-brown shade is obtained by treating the azo dyestuff obtainable from aniline and 8-hydroxy-quinoline-5-sulphonic acid with agents supplying chromium; this dyestuff dyes leather and wool orange yellow shades.

Example 2

34.3 parts of the azo dyestuff obtained from diazotized sulphanilic acid and 5-methyl-8-hydroxyquinoline are dissolved in from 500 to 600 parts of water and heated with a solution of chromium formate in the manner described in Example 2. The resulting dyestuff yields brown dyeings on leather.

The corresponding copper compound may be obtained by heating the initial dyestuff with a solution of copper sulphate or tetramine cupric sulphate.

Example 3

39.3 parts of the azo dyestuff obtained from diazotized 1.7-naphthylamine-sulphonic acid and 5-methyl-8-hydroxyquinoline are dissolved in from 500 to 600 parts of water and heated in a closed vessel for 3 hours at 110° C. under the pressure developed with a solution of chromium formate containing 9.7 parts of $Cr_2O_3$. The resulting dyestuff is salted out and dried. It dyes leather beautiful brown shades.

Example 4

36.3 parts of the azo dyestuff obtained from diazotized sulphanilic acid and 5-chlor-8-hydroxyquinoline are treated with chromium formate as described in Example 1. The resulting dyestuff is salted out and dried. It yields brown shades on leather. The dyestuff derived from 5-bromo-8-hydroxyquinoline yields similar shades. Nitrated derivatives of 8-hydroxyquinoline may be used instead of halogenated ones.

Example 5

59.3 parts of the disazo dyestuff derived from 1 molecular proportion of diazotized aminoazobenzene disulphonic acid

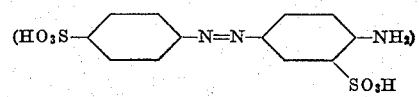

and 1 molecular proportion of 8-hydroxy-quinoline-5-sulphonic acid are treated with chromium formate in the manner described in Example 1. Instead of chromium formate, the equivalent amount of chromium fluoride, acetate, sulphate or other chromium salt may be employed. The resulting dyestuff yields brown-red dyeings on leather and silk.

Example 6

62.1 parts of the disazo dyestuff obtainable from 1 molecular proportion of benzidine-2,2'-disulphonic acid, 1 molecular proportion of 8-oxyquinoline and 1 molecular proportion of resorcin are dissolved in 600 to 800 parts of water and heated to boiling together with a solution of chromium formate containing 19.4 parts of $Cr_2O_3$ for about 15 hours. The dyestuff obtained is salted out and dried. It dyes leather reddish brown shades.

Example 7

68.5 parts of the disazo dyestuff obtained by coupling 1,8-aminonaphthol-3,6-disulphonic acid with diazotized picramic acid, diazotizing the compound thus obtained and coupling it with 8-oxyquinoline are dissolved in 600 to 800 parts of water and chromed as described in Example 6. The dyestuff obtained yields on leather dyeings of Russian green shades.

Example 8

37.4 parts of the dyestuff obtainable from diazotized para-nitraniline and 8-hydroxyquinoline-5-sulphonic acid are dissolved in between 500 and 600 parts of water and heated to boiling for 12 to 15 hours with a solution of chromium formate containing chromium in an amount corresponding to 9.7 parts of $Cr_2O_3$. The dyestuff obtained is salted out and dried. It dyes wool yellow red shades of excellent fastness properties.

Example 9

35.9 parts of the dyestuff obtainable by coupling diazotized ortho-anisidine with 8-hydroxyquinoline-5-sulphonic acid are dissolved in between 500 and 600 parts of water and treated with a chromium formate solution as described in the foregoing example. The dyestuff obtained dyes leather full brown shades.

Example 10

43.5 parts of the dyestuff obtainable by coupling diazotized picramic acid with 8-hydroxyquinoline-5-sulphonic acid are dissolved in between 500 and 600 parts of water and heated to boiling for 3 hours together with a solution of chromium formate the chromium content of which corresponds to 9.7 parts of $Cr_2O_3$. The dyestuff obtained is salted out and dried. It dyes wool brown-violet shades of good fastness to washing and fulling.

In a similar manner complex chromium compounds of other ortho-hydroxyazo dyestuffs may be obtained, for example those of the dyestuffs derived from the coupling component 8-hydroxyquinoline-5-sulphonic acid and the following diazo components:—Para-chlor-ortho-aminophenol, 5-nitro-ortho-amino-phenol, 4-nitro-ortho-aminophenol-6-sulphonic acid and the like.

What we claim is:—

1. The process of producing complex metal compounds of azo dyestuffs which comprises reacting an azo dyestuff containing at least one acid group and containing as the coupling component an 8-hydroxyquinoline, in substance with an agent supplying a heavy metal.

2. Substances capable of dyeing fibers and consisting of complex heavy metal compounds of azo dyestuffs containing as the coupling component an 8-hydroxyquinoline.

3. Substances capable of dyeing fibers and consisting of complex iron compounds of azo dyestuffs containing as the coupling component an 8-hydroxyquinoline.

4. Substances capable of dyeing fibers and consisting of complex chromium compounds of azo dyestuffs containing as the coupling component an 8-hydroxyquinoline.

5. The substance capable of dyeing fibers and consisting of the complex chromium compound of the azo dyestuff corresponding to the formula

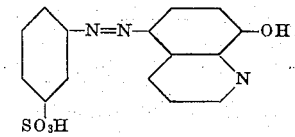

HANS KRZIKALLA.
WALTER LIMBACHER.